US012792137B1

(12) United States Patent
Roggen et al.

(10) Patent No.: US 12,792,137 B1
(45) Date of Patent: Nov. 10, 2026

(54) COMPUTER APPLICATION FOR FACILITATING A SEDENTARY ASSESSMENT OF A USER

(71) Applicant: Google LLC, Mountain View, CA (US)

(72) Inventors: Daniel Ruedi Roggen, Brighton (GB); Justin Paul Phillips, London (GB); Andreea Raluca Stefania Milescu, Bucharest (RO); Robert Keith Harle, Hitchin (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/222,091

(22) Filed: May 29, 2025

(51) Int. Cl.
*G06N 3/092* (2023.01)
*G06F 1/16* (2006.01)
*G06F 3/01* (2006.01)

(52) U.S. Cl.
CPC .............. *G06F 3/011* (2013.01); *G06F 1/163* (2013.01)

(58) Field of Classification Search
CPC ........ G16H 40/63; G16H 20/40; G16H 20/30; G16H 50/70; G16H 50/30; G08B 21/0415; G06F 19/3481; G06F 19/3406; G06F 3/011; G06F 1/163; A61B 5/0022; A61B 5/11; G06Q 50/22; G06N 3/08; G06N 3/092
See application file for complete search history.

(56) References Cited

U.S. PATENT DOCUMENTS 8,814,754 B2 * 8/2014 Weast .................... A61B 5/1118 482/901
9,754,078 B2 * 9/2017 Ramsay .................. G06F 3/016
9,772,494 B2 * 9/2017 Rabii ..................... G06F 3/0444
10,497,246 B2 * 12/2019 Arnold ................. A61B 5/7264
10,699,806 B1 6/2020 Toumazou et al.
11,129,534 B2 * 9/2021 Arnold ................. A61B 5/7264
12,114,959 B2 * 10/2024 Arnold ................... G16H 20/40
2004/0145493 A1 * 7/2004 O'Connor ............. A61B 5/1118 340/870.09
2008/0255794 A1 * 10/2008 Levine .................... G01P 13/00 702/141
2008/0319279 A1 * 12/2008 Ramsay ................. A61B 5/486 600/301
2012/0253485 A1 * 10/2012 Weast ..................... G06F 1/163 700/91
(Continued)

OTHER PUBLICATIONS

Liao et al. "Personalized HeartSteps", Sep. 10, 2019.*
(Continued)

*Primary Examiner* — Olga V Merkoulova
(74) *Attorney, Agent, or Firm* — DORITY & MANNING P.A.

(57) ABSTRACT

A method for facilitating a sedentary assessment of a user includes obtaining one or more historical activities for the user. The one or more historical activities are defined by a respective duration and a respective one of a sedentary activity level or a non-sedentary activity level. The method also includes determining a sedentary allowance for the user based at least partially on the one or more historical activities for the user. The sedentary allowance is configured to assess a permitted sedentarism for the user. In addition, causing a display screen of a wearable computing device to display the sedentary allowance for the user.

18 Claims, 9 Drawing Sheets

(56) References Cited

U.S. PATENT DOCUMENTS

| | | | | |
|---|---|---|---|---|
| 2012/0326873 | A1* | 12/2012 | Utter, II | G06F 3/016 340/573.1 |
| 2013/0006125 | A1 | 1/2013 | Kroll et al. | |
| 2014/0085077 | A1* | 3/2014 | Luna | A61B 5/0205 340/539.11 |
| 2015/0220883 | A1* | 8/2015 | B'Far | G06Q 10/105 700/91 |
| 2016/0025975 | A1* | 1/2016 | Rabii | G06T 1/20 345/173 |
| 2018/0061204 | A1* | 3/2018 | Arnold | G16H 40/63 |
| 2020/0184793 | A1* | 6/2020 | Arnold | G16H 20/40 |
| 2022/0079440 | A1* | 3/2022 | Arnold | A61B 5/02055 |
| 2022/0296966 | A1 | 9/2022 | Asikainen et al. | |
| 2024/0242812 | A1* | 7/2024 | Weast | G16H 20/30 |

OTHER PUBLICATIONS

Mellow et al. "An Interactive Tool to Personalize 24-hour activity, Sitting and Sleep Prescription for Optimal Health Outcomes" Mar. 17, 2026.*

Aunger et al., "Objective and Subjective Measurement of Sedentary Behavior in Human Adults: A Toolkit", American Journal of Human Biology, vol. 34, Issue 1, Jan. 2022, 22 pages.

Banach et al. "The Association Between Daily Step Count and All-Cause and Cardiovascular Mortality: A Meta-Analysis", European Journal of Preventive Cardiology, vol. 30, Issue 18, Dec. 2023, pp. 1975-1985.

Diaz et al. "Patterns of Sedentary Behavior and Mortality in US Middle-Aged and Older Adults: A National Cohort Study", Annals of Internal Medicine vol. 167, Issue 7, Oct. 3, 2017, pp. 465-475.

Ellingson et al., Wearable Technology Reduces Prolonged Bouts of Sedentary Behavior. Translational Journal of the American College of Sports Medicine, vol. 1, Issue 2, Apr. 2016, pp. 10-17.

Low et al., "A Real-Time Mobile Intervention to Reduce Sedentary Behavior Before and After Cancer Surgery: Usability and Feasibility Study", Journal of Medical Internet Research Perioperative Medicine, vol. 3, Issue 1, Mar. 23, 2020, 9 pages.

Reeder et al., "Health at Hand: A Systematic Review of Smart Watch Uses for Health and Wellness", Journal of Biomedical Informatics, vol. 63, Oct. 2016, pp. 269-276.

Triantafyllidis et al., "Smartwatch Interventions in Healthcare: A Systematic Review of the Literature", International Journal of Medical Informatics, Video 190, Oct. 2024, 9 pages.

Zimmermann et al., "EPARS: Elderly Physical Activity Reminder System Using Smartphone and Wearable Sensors", The 2019 Association for Computing Machinery International Joint Conference on Pervasive and Ubiquitous Computing, London, United Kingdom, Sep. 9-13, 2019, 7 pages.

* cited by examiner

COMPUTER APPLICATION FOR FACILITATING A SEDENTARY ASSESSMENT OF A USER

FIELD

The present disclosure relates generally to a computer application implemented on a wearable computing device, mobile computing device, and/or server system that facilitates a sedentary assessment of a user.

BACKGROUND

Individuals are unique and their motivational and adherence patterns in striving for a behavioral goal can vary significantly. Health-related changes in response to a behavioral change can also vary between people. Advances in sensors and wearable technologies have made it increasingly possible for individuals to collect data about themselves with the goal of self-knowledge through personal data. However, gaining self-knowledge can be more challenging than only a simple task of data collection.

For example, human health may be influenced by a plurality of factors. As such, health management may be delayed until after an onset of noticeable symptoms and/or reaching a certain age. Due to this reactive approach, individuals may lack knowledge and motivation to adopt and/or maintain behaviors associated with better health.

Accordingly, the present disclosure is directed to a computer application that can be implemented on a wearable computing device, mobile computing device, and/or server system to allow a user to proactively receive an adaptable sedentary allowance configured to assess a permitted sedentarism for the user.

SUMMARY

Aspects and advantages of embodiments of the present disclosure will be set forth in part in the following description, or can be learned from the description, or can be learned through practice of the embodiments.

In an aspect, the present disclosure is directed to a method for facilitating a sedentary assessment of a user. The method includes obtaining one or more historical activities for the user. The one or more historical activities are defined by a respective duration and a respective one of a sedentary activity level or a non-sedentary activity level. The method also includes determining a sedentary allowance for the user based at least partially on the one or more historical activities for the user. The sedentary allowance is configured to assess a permitted sedentarism for the user. In addition, causing a display screen of a wearable computing device to display the sedentary allowance for the user.

In another aspect, the present disclosure is directed to a wearable computing device. The wearable computing device includes one or more processors. The wearable computing device also includes one or more computer-readable media that collectively store instructions that, when executed by the one or more processors, cause the wearable computing device to perform operations. The operations include obtaining one or more historical activities for a user. The one or more historical activities are defined by a respective duration and a respective one of a sedentary activity level or a non-sedentary activity level. The method also includes determining a sedentary allowance for the user based at least partially on the one or more historical activities for the user. The sedentary allowance is configured to assess a permitted sedentarism for the user. In addition, the method includes causing a display screen of the wearable computing device to display the sedentary allowance for the user.

In yet another aspect, the present disclosure is directed to a method for facilitating a sedentary assessment of a user. The method includes obtaining one or more historical activities for the user. The one or more historical activities are defined by a respective duration and a respective one of a sedentary activity level or a non-sedentary activity level. The method also includes determining a sedentary allowance for the user based at least partially on the one or more historical activities for the user. The sedentary allowance is configured to assess a permitted sedentarism for the user. In addition, the method includes, in response to determining the sedentary allowance is less than or equal to a threshold, causing one or more components of a user computing device to output an alert to the user, the alert comprising at least one of audio, visual, and haptic feedback.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
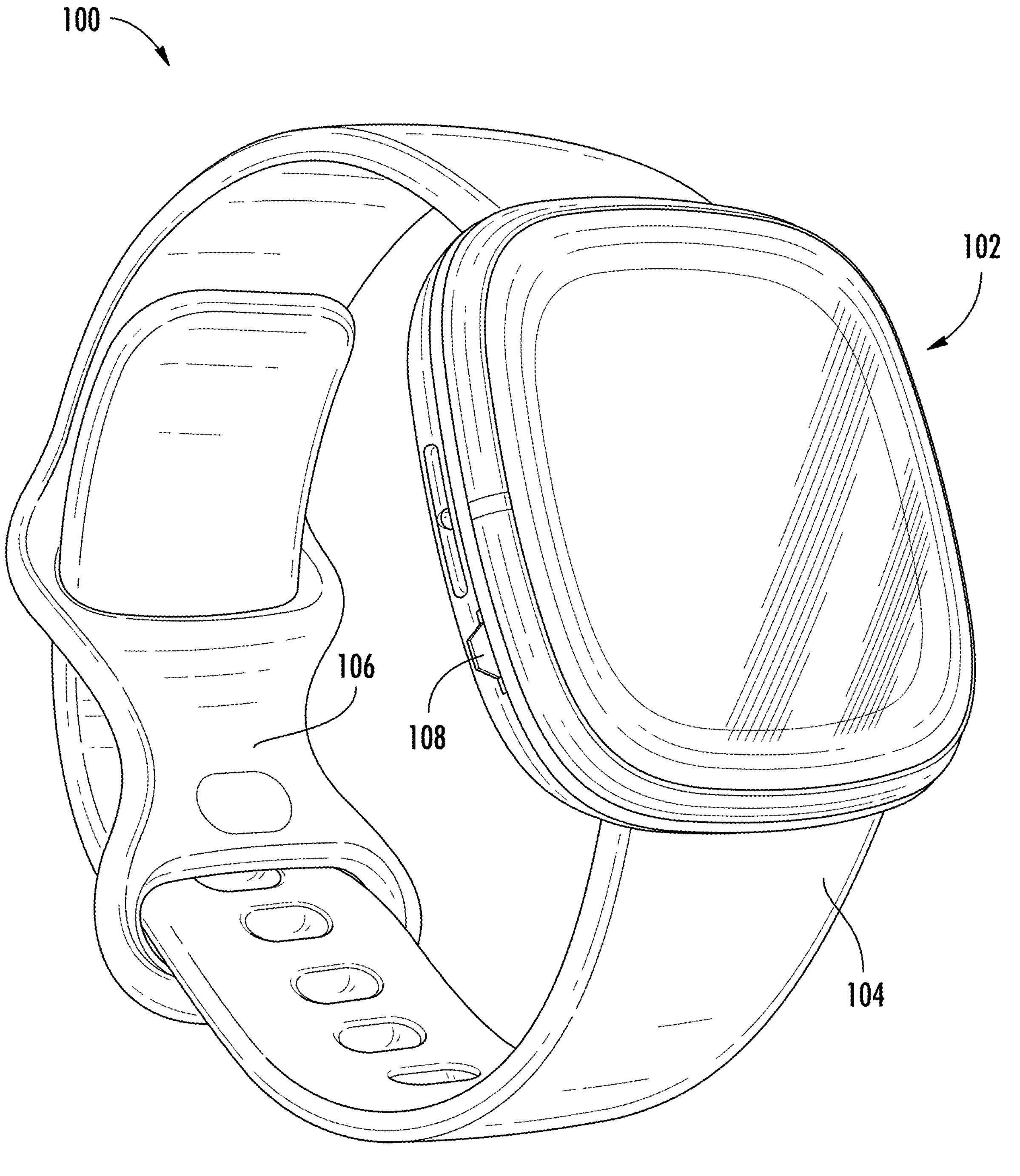
FIG. 1 illustrates a perspective view of an embodiment of a wearable computing device according to the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Repeated use of reference characters and/or numerals in the present specification and/or figures is intended to represent the same or analogous features, elements, or operations of the present disclosure. Repeated description of reference characters and/or numerals that are repeated in the present specification is omitted for brevity.

As referred to herein, the terms “includes” and “including” are intended to be inclusive in a manner similar to the term “comprising.” As referenced herein, the terms “or” and “and/or” are generally intended to be inclusive, that is (i.e.), “A or B” or “A and/or B” are each intended to mean “A or B or both.” As referred to herein, the terms “first,” “second,” “third,” and so on, can be used interchangeably to distinguish one component or entity from another and are not intended to signify location, functionality, or importance of the individual components or entities. As referenced herein, the terms “couple,” “couples,” “coupled,” and/or “coupling” refer to communicative coupling, electrical and/or electromagnetic coupling (e.g., capacitive coupling, inductive coupling, direct and/or connected coupling, etc.), mechanical coupling, operative coupling, optical coupling, and/or physical coupling.

As referenced herein, the term “system” can refer to hardware (e.g., application specific hardware), computer logic that executes on a general-purpose processor (e.g., a central processing unit (CPU)), and/or some combination thereof. In some embodiments, a “system” described herein can be implemented in hardware, application specific circuits, firmware, and/or software controlling a general-purpose processor. In some embodiments, a “system” described herein can be implemented as program code files stored on a storage device, loaded into a memory, and executed by a processor, and/or can be provided from computer program products, for example, computer-executable instructions that are stored in a tangible computer-readable storage medium (e.g., random-access memory (RAM), hard disk, optical media, magnetic media).

As mentioned, individuals are unique and their motivational and adherence patterns to improve health-related habits vary from person-to-person. Health-related changes in response to a behavior change can also vary between people. Advances in sensors and wearable devices have made it increasingly possible for individuals to collect data about themselves with the goal of self-knowledge through personal data. However, gaining self-knowledge can be more challenging than only a simple task of data collection.

For example, individuals may lack a clear understanding of how sedentary activities affect their health. A lack of a standardized way to adaptively determine a permitted duration of sedentary activity presents challenges for individuals to assess changes in health over time (e.g., days, months, years, etc.). As such, individuals may lack knowledge and motivation to adopt and/or maintain behaviors that can improve overall health.

Therefore, providing context to the permitted duration of sedentary activity can help individuals to understand its change in response to various non-sedentary activities and the relationship therebetween. Moreover, understanding relationships between various non-sedentary activities and corresponding behaviors can provide valuable context into interpreting the permitted duration of sedentary activity and changes in the permitted duration of sedentary activity associated with a behavior.

Motivated by the need to improve understanding of personal data, the present disclosure is directed to a sedentary assessment program for a computer application that is configured to adaptively determine a sedentary allowance for a user according to a standardized approach. Thus, in an embodiment, the computer application of the present disclosure is configured to support individuals in understanding the relationship between their sedentary activities and non-sedentary activities so as to encourage individuals to adjust their behaviors to mitigate risks of developing health issues and/or to generally improve overall health. In particular, the computer application of the present disclosure enables participants to receive a sedentary allowance configured to assess a permitted sedentarism for the user in addition to rigorous insights, contextual information, and data visualizations to help participants understand their activity.

Further, a user may be provided with privacy-related controls allowing the user to make an election as to both if and when systems, programs, or features described herein may enable collection of health-related data and/or user information (e.g., information about a user’s social network, social actions, or activities, profession, a user’s preferences, or a user’s current location), and if the user is sent content or communications that may be of a sensitive or private nature from a server. In addition, certain data may be treated in one or more ways before it is stored or used, so that personally identifiable information is removed. For example, a user’s identity may be treated so that no personally identifiable information can be determined for the user, or a user’s geographic location may be generalized where location information is obtained (such as to a city, ZIP code, or state level), so that a particular location of a user cannot be determined. Thus, the user may have control over what information is collected about the user, how that information is used, and what information is provided to the user. To that end, any information collected as described herein relating to the user (e.g., personal medical data, health conditions, etc.) is capable of being kept private and confidential and not being improperly used or published.

Moreover, one or more security measures can be implemented to ensure that the demographic data and/or physiological data of the user is safeguarded. For example, passcode or fingerprint authentication may be used to control access to the demographic data and the physiological or otherwise personal data of the user. Further, such data of the user can be stored in a privacy enhancing manner and not shared without the express consent of the user. For example, such data can be encrypted to secure the data from unauthorized access.

Example aspects of the present disclosure provide several technical effects, benefits, and/or improvements in computing technology.

Example Devices and Systems

Referring now to the drawings, FIG. 1 illustrates perspective views of an example wearable computing device 100 according to one or more example embodiments of the present disclosure. In example embodiments, the wearable computing device 100 may include, for example, a wearable physiological monitoring device that can be worn by a user and/or capture one or more types of physiological data of the user (e.g., HR data, motion data (e.g., accelerometer data), body temperature data, respiration rate data, blood pressure data, blood oxygenation level data, electrodermal activity (EDA) data, stress related data).

Furthermore, in an embodiment, the wearable computing device 100 may include a display 102, an attachment component 104, a securement component 106, and a button 108 that can be located on a side of the wearable computing device 100. In an embodiment, two sides of the display 102 can be coupled (e.g., mechanically, operatively) to the attachment component 104. In some embodiments, the securement component 106 can be located on, coupled to (e.g., mechanically, operatively), and/or integrated with the attachment component 104. In these or other embodiments, the securement component 106 can be positioned opposite the display 102 on an opposing end of the attachment component 104. In some embodiments, the button 108 can be located on a side of the wearable computing device 100, underneath the display 102.

Furthermore, the display 102 may include any type of electronic display or screen known in the art. For example, in some embodiments, the display 102 may include a liquid crystal display (LCD) or organic light emitting diode (OLED) display such as, for instance, a transmissive LCD display or a transmissive OLED display. Further, the display 102 can be configured to provide brightness, contrast, and/or color saturation features according to display settings that can be maintained by control circuitry and/or other internal components and/or circuitry of the wearable computing device 100. In some embodiments, the display 102 may include a touchscreen such as, for instance, a capacitive touchscreen. For example, in these embodiments, the display 102 may include a surface capacitive touchscreen or a projective capacitive touch screen that can be configured to respond to contact with electrical charge-holding members or tools, such as a human finger. While the wearable computing device 100 is shown in example embodiments of the present disclosure to have the display 102, it should be understood that, in some embodiments, the wearable computing device 100 does not have any type of display unit.

In some embodiments, the display 102 can be configured to provide (e.g., render) a variety of information such as, for example, the time, the date, physiological data of a user wearing the wearable computing device 100, readings based upon user input, and/or other information. In an embodiment, the physiological data can include, but are not limited to, HR data (e.g., heart beats per minute), motion data (e.g., movement data, accelerometer data), blood pressure data, body temperature data, respiration rate data, blood oxygenation level data, EDA data, stress related data and/or any other physiological data that one of ordinary skill in the art would understand that can be measured by the wearable computing device 100. In some embodiments, the readings based upon user input can include, but are not limited to, activities performed by the user, a sleep schedule of the user, and/or any other metric that one of ordinary skill in the art would understand that can be input by a user into the wearable computing device 100.

The attachment component 104 can be used to attach (e.g., affix, fasten) the wearable computing device 100 to a user thereof (e.g., to the user's body or clothing). In some embodiments, the attachment component 104 can take the form of, for example, a strap, an elastic band, a rope, and/or any other form of attachment one of ordinary skill in the art would understand can be used to attach the wearable computing device 100 to a user. For example, the wearable computing device 100 can be configured as a wrist bracelet, watch, ring, electrode, finger-clip, toe-clip, chest-strap, ankle strap, and/or a device placed in a pocket. In additional or alternative embodiments, the wearable computing device 100 can be embedded in something in contact with the user 10 such as, for instance, clothing and/or another accessory.

The securement component 106 can facilitate attachment of attachment component 104 upon a user of wearable computing device 100. In some embodiments, the securement component 106 can include, but is not limited to, a pin and hole locking mechanism (e.g., a buckle), a magnet system, a lock, a clip, and/or any other type of securement that one of ordinary skill would understand can be used to facilitate attachment of the wearable computing device 100 to a user. In an embodiment, the wearable computing device 100 does not include the securement component 106. For example, in an embodiment, the wearable computing device 100 can be secured to a user with a strap that can be tied around the user's wrist and/or another suitable appendage.

The button 108 can allow for a user to interact with the wearable computing device 100 and/or allow for the user to provide a form of input into wearable computing device 100. For instance, as described above, in example embodiments, the wearable computing device 100 can include a screen such as, for example, a touch screen that can receive inputs through (e.g., by way of) the touch of the user. In additional or alternative embodiments, the wearable computing device 100 can include a microphone that can receive inputs through (e.g., by way of) voice commands of a user.

Figure 2:
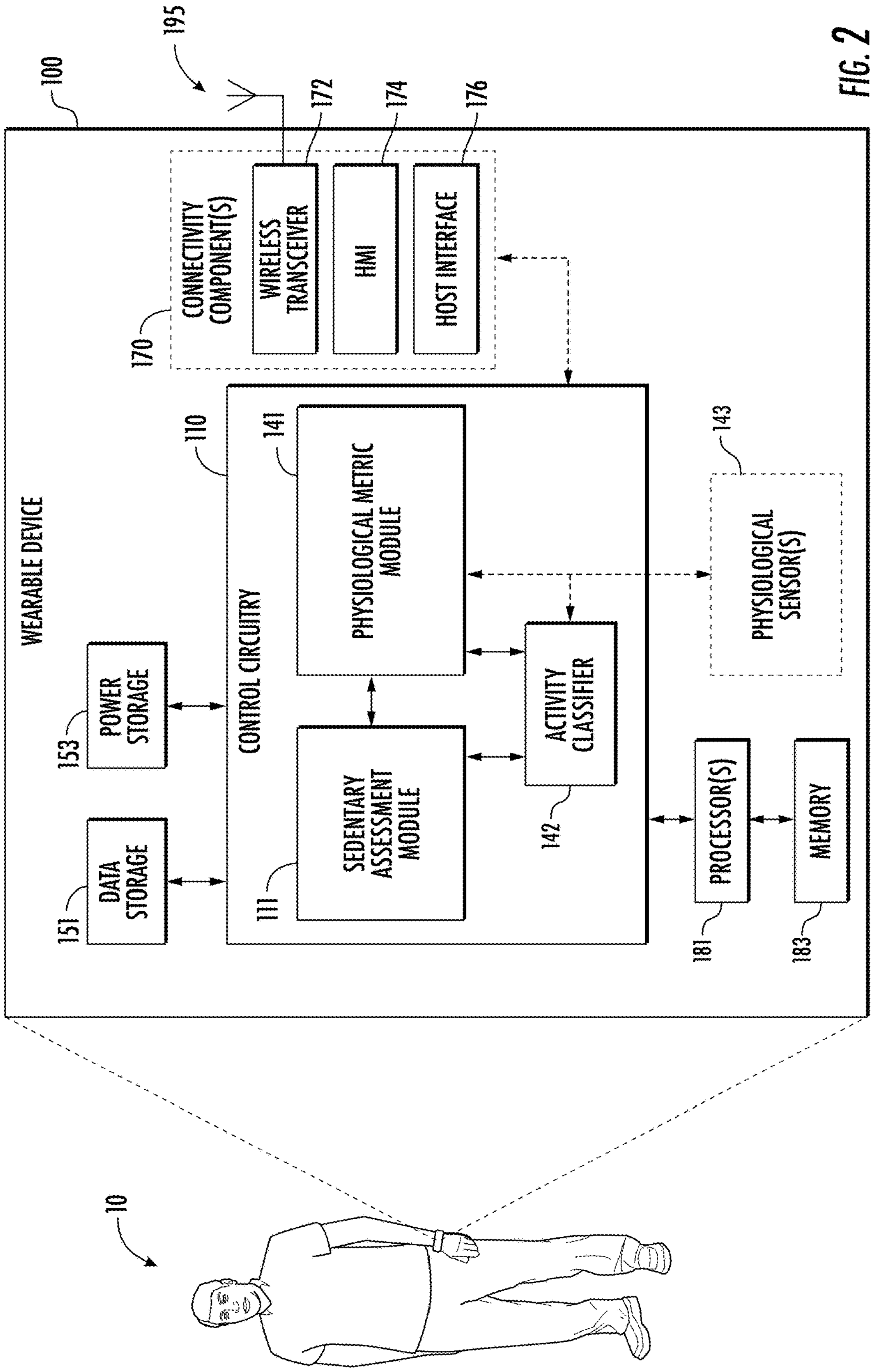
FIG. 2 illustrates a schematic diagram of the wearable computing device of FIG. 1.

Referring now to FIG. 2, a block diagram of the wearable computing device 100 according to one or more example embodiments of the present disclosure is illustrated. That is, for instance, FIG. 2 illustrates a block diagram of one or more internal and/or external components of the wearable computing device 100 according to one or more example embodiments of the present disclosure.

Although certain embodiments are disclosed herein in the context of wearable physiological monitoring devices, it should be appreciated that the present disclosure is not so limiting. For example, it should be understood that the physiological monitoring principles and features disclosed herein can be performed and/or implemented using any suitable type of computing device or combination of computing devices such as, for example, a client computing device, a laptop, a tablet, a server (e.g., a server system 312 described below and depicted in FIG. 4), the wearable computing device 100, a mobile computing device 304, such as a smartphone, an ambient computing device, and/or another computing device, whether wearable or not.

As shown in FIG. 2, the wearable computing device 100 can be worn by a user 10 and/or can be configured to gather data regarding activities performed by user 10 and/or a physiological state of the user 10. In some embodiments, the data may include motion data regarding the user's movements and/or physiological data obtained by measuring various physiological characteristics of the user 10 (e.g., heart rate, respiratory data, body temperature, blood oxygen levels, perspiration levels, movement data (such as steps, cycles, and/or any other suitable metric indicating physical activity of the user)).

Further, as shown, the wearable computing device 100 can include control circuitry 110. Although certain modules and/or components are illustrated as part of the control circuitry 110 in the diagram of FIG. 2, it should be understood that the control circuitry 110 associated with the wearable computing device 100 and/or other components or devices in accordance with example embodiments of the present disclosure can include additional components and/or circuitry such as, for instance, one or more additional components of the illustrated components depicted in FIG. 2. Furthermore, in certain embodiments, one or more of the illustrated components of the control circuitry 110 can be omitted and/or different than that shown in FIG. 2 and described in association therewith.

The term "control circuitry" is used herein according to its broad and/ordinary meaning and can include any combination of software and/or hardware elements, devices, and/or features that can be implemented in connection with operation of the wearable computing device 100. Furthermore, the term "control circuitry" can be used substantially interchangeably in certain contexts herein with one or more of the terms "controller," "integrated circuit," "IC," "application-specific integrated circuit," "ASIC," "controller chip," or the like.

The control circuitry 110 may include one or more processors 181, one or more memory devices 183, and/or electrical connections. In an embodiment, the control circuitry 110 can be implemented on a system on a chip (SoC), however, those skilled in the art will recognize that other hardware and/or firmware implementations are possible.

In one or more embodiments, the processor(s) 181 can be configured to execute computer-readable instructions that, when executed, cause the wearable computing device 100 to perform one or more operations. In at least an embodiment, the processor(s) 181 can be configured to execute operational code (e.g., instructions, processing threads, software) for the wearable computing device 100 such as, for instance, firmware or the like. In the example embodiment depicted in FIG. 2, the processor(s) 181 can each be a central processing unit (CPU), microprocessor, microcontroller, integrated circuit (e.g., an application-specific integrated circuit (ASIC)), and/or another type of processing device. In this or another example embodiment, the processor(s) 181 can be coupled to (e.g., electrically, communicatively, physically, operatively) to one or more components of the control circuitry 110 and/or the wearable computing device 100 such that the processor(s) 181 can facilitate one or more operations in accordance with the embodiments described herein.

In an embodiment, as shown in FIG. 2, the computer-readable instructions and/or operational code that can be executed by the processor(s) 181 can be stored in one or more data storage devices of the wearable computing device 100, such as the memory device(s) 183 of the wearable computing device 100. In some embodiments, the memory device(s) 183 can be coupled to (e.g., electrically, communicatively, physically, operatively) to one or more components of the control circuitry 110 and/or the wearable computing device 100 such that the memory device(s) 183 can facilitate one or more operations in accordance with the embodiments described herein.

The memory device(s) 183 can store computer-readable and/or computer executable entities (e.g., data, information, applications, models, algorithms) that can be created, modified, accessed, read, retrieved, and/or executed by each of the processor(s) 181. In some embodiments, the memory device(s) 183 can constitute, include, be coupled to (e.g., operatively), and/or otherwise be associated with a computing system and/or media such as, for example, one or more computer-readable media, volatile memory, non-volatile memory, random-access memory (RAM), read only memory (ROM), hard drives, flash drives, and/or other memory devices. In these or other embodiments, such one or more computer-readable media can include, constitute, be coupled to (e.g., operatively), and/or otherwise be associated with one or more non-transitory computer-readable media.

Still referring to FIG. 2, the control circuitry 110 may include a sedentary assessment module 111, a physiological metric module 141, an activity classifier 142, and/or other modules and/or data that can be used to facilitate one or more operations described herein. The sedentary assessment module 111 may include one or more hardware and/or software components and/or features that can be configured to perform sedentary assessment of the user 10, as described further below. In some embodiments, to perform such assessment(s), the sedentary assessment module 111 can use inputs from the physiological metric module 141 and/or the activity classifier 142, as described further below.

The wearable computing device 100 can further include one or more physiological sensors 143 communicatively coupled to the sedentary assessment module 111 and/or the physiological metric module 141. In embodiments, the physiological sensor(s) 143 may include physiological sensors that can be configured to collect the physiological data of the user 10 in accordance with various embodiments disclosed herein. For example, the physiological sensor(s) 143 may include an inertial measurement unit (IMU) which includes one or more accelerometers and/or one or more gyroscopes. The accelerometer(s) may be used to capture motion information with respect to the wearable computing device 100. The gyroscope(s) may also be used additionally or alternatively to capture motion information with respect to the wearable computing device 100. For example, the IMU may be configured as a six-axis or six-dimensional inertial measurement unit (e.g., a tri-axial accelerometer and a tri-axial gyroscope). The motion information obtained via the IMU may be associated with the user when the wearable computing device 100 is worn or carried by the user 10. The IMU may further include one or more magnetometers, one or more barometers, and/or any other suitable sensors.

As another example, the physiological sensor(s) 143 may include a heart rate sensor, photoplethysmography (PPG) sensor, and/or other physiological sensors. In some embodiments, the physiological sensor(s) 143 can be disposed on, coupled to, embedded and/or integrated in, and/or otherwise be associated with the wearable computing device 100 such that the physiological sensor(s) 143 can be in contact with or substantially in contact with human skin when the wearable computing device 100 is worn by the user 10. For example, in embodiments the physiological sensor(s) 143 can be disposed on, coupled to, and/or otherwise be associated with an interior or skin-side of the wearable computing device 100 (e.g., a side of the wearable computing device 100 that contacts, touches, and/or faces the skin of the user 10). In additional and/or alternative embodiments, the wearable computing device 100 can be configured to receive the physiological data of the user 10 from one or more physiological sensors 143 external to (e.g., not embedded and/or integrated in) the wearable computing device 100.

In an embodiment, as mentioned, the physiological metric module 141 can, for example, be communicatively coupled with the physiological sensor(s) 143 such that the physiological metric module 141 can receive the data of the user 10 collected by the physiological sensor(s) 143. The physiological metric module 141 can, for example, calculate physiological metrics, including but not limited to, the cardiac metric(s) (such as, but not limited to, a resting heart rate (RHR), an average heart rate (MeanHR), a maximum heart rate (MaxHR), a heart rate recovery (HRR), and a maximal oxygen consumption (VO2max)), respiratory metric(s), neurological metric(s), musculoskeletal metric(s), etc., of the user 10 based on the data of the user 10 (e.g., according to known physiological metric calculations). For example, the physiological metric module 141 may include a machine-learned model trained to receive the sensor data as input and to generate the physiological metrics and/or assessments as output. In additional or alternative embodiments, the wearable computing device 100 can be configured to communicate with another computing device or server that can analyze and/or interpret the collected sensor data (e.g., according to known physiological metric calculations), as described further below.

Further, the activity classifier 142 can, for example, be communicatively coupled with the physiological sensor(s) 143 and/or the physiological metric module 141. As such, the activity classifier 142 can receive the data of the user 10 collected by the physiological sensor(s) 143 and/or the physiological metrics calculated by the physiological metric module 141. The activity classifier 142 can, for example, identify a current activity of the user 10 based on the physiological data and/or the physiological metrics. The current activity can be defined by an activity level and a duration. The duration may specify a start timestamp and an end timestamp (i.e., a current time) of the current activity. The activity level can be one of a sedentary activity level or a non-sedentary activity level. For example, the activity classifier 142 may be configured to classify the activity level as sedentary based on a cardiac metric, such as a heart rate, being equal to or less than a cardiac threshold value, and/or a motion metric, such as an acceleration, being equal to or less than a motion threshold. Further, the activity classifier 142 may be configured to classify the activity level as non-sedentary based on the cardiac metric being greater than the cardiac threshold and/or the motion metric being greater than the motion threshold. In embodiments, the activity classifier 142 may, for example, include a machine-learned model trained to receive the physiological data and/or physiological metrics as input and to generate the activity level and the duration (e.g., the start timestamp and the end timestamp) of the current activity and/or identify the current activity type (e.g., such as running, walking, climbing, rowing, etc.) as output.

Moreover, the activity classifier 142 may be configured to determine the duration of the current activity based on an amount of time that the activity level remains classified as one of sedentary or non-sedentary. That is, the duration of the current activity may be determined by the start timestamp, which corresponds to a time when the classification of the activity level or type of the user 10 changes to a current classification, and the end timestamp, which corresponds to a time when the classification of the activity level or type of the user 10 changes to a different classification and/or the current time. In some embodiments, the activity classifier 142 may be further configured to identify an intensity of the non-sedentary activity level. In such embodiments, the activity classifier 142 may classify the non-sedentary activity level as high-intensity or low-intensity based on comparing the cardiac metric to a second cardiac threshold that is greater than the cardiac threshold and/or comparing the motion metric to a second motion threshold that is greater than the motion threshold. In additional or alternative embodiments, the activity classifier 142 may classify the non-sedentary activity level based on energy expenditure (e.g., determined based on calories, watts, etc.).

In the example embodiment depicted in FIG. 2, the wearable computing device 100 can include one or more data storage components 151 (denoted in FIG. 2 as "data storage 151") communicatively coupled to the control circuitry 110. The data storage component(s) 151 may include any suitable or desirable type of data storage such as, for instance, solid-state memory, which can be volatile or non-volatile. In some embodiments, such solid-state memory of the wearable computing device 100 may include any of a wide variety of technologies such as, for instance, flash integrated circuits, phase change (PC) memory, phase change (PC) random-access memory (RAM), programmable metallization cell RAM (PMC-RAM or PMCm), ovonic unified memory (OUM), resistance RAM (RRAM), NAND memory, NOR memory, EEPROM, ferroelectric memory (FeRAM), MRAM, or other discrete NVM (non-volatile solid-state memory) chips. In some embodiments, the data storage component(s) 151 can be used to store system data, such as operating system data and/or system configurations or parameters. In some embodiments, the wearable computing device 100 can include data storage utilized as a buffer and/or cache memory for operational use by the control circuitry 110.

The data storage component(s) 151 can include various sub-modules that can be implemented to facilitate the physiological monitoring and the cardiac assessment principles and features disclosed herein. For example, in at least an embodiment, the data storage component(s) 151 can include one or more sub-modules that can include, but not limited to: an information collection module that can manage the collection of the physiological data, demographic data, and/or anthropometric data; a heart rate determination module that can determine values and/or patterns of one or more types of heart rates of the user 10; the sedentary assessment module 111; the activity classifier 142; a sleep detection module that can detect an attempt or onset of sleep by the user 10; a presentation module that can manage presentation of information to the user 10 that can be associated with the sedentary assessment; a feedback management module for collecting and interpreting any input data and/or feedback received from the user 10; and/or another sub-module.

The wearable computing device 100 can further include a power storage module 153 (denoted in FIG. 2 as "power storage 153"), which may include a rechargeable battery, one or more capacitors, or other charge-holding device(s). In some embodiments, the power stored by the power storage module 153 can be utilized by the control circuitry 110 for operation of the wearable computing device 100, such as for powering the display 102. In some embodiments, the power storage module 153 can receive power over a host interface of the wearable computing device 100 (e.g., via one or more host interface circuitry and/or components 176 (denoted as "host interface 176" in FIG. 2)) and/or through other means.

The wearable computing device 100 can further include one or more connectivity components 170, which can include, for example, a wireless transceiver 172. The wireless transceiver 172 can be communicatively coupled to one or more antenna devices 195, which can be configured to wirelessly transmit and/or receive data and/or power signals to and/or from the wearable computing device 100 using, but not limited to, peer-to-peer, WLAN, and/or cellular communications. For example, the wireless transceiver 172 can be utilized to communicate data and/or power between the wearable computing device 100 and an external computing device, which can be configured to interface with the wearable computing device 100. In certain embodiments, the host interface 176 can include, for example, wired and/or wireless interface components that can communicatively couple the wearable computing device 100 with the external computing device to receive data and/or power therefrom and/or transmit data thereto. The host interface 176 according to example embodiments can utilize and/or otherwise be associated with any suitable or desirable communication protocol and/or physical connector such as, for instance, universal serial bus (USB), micro-USB, Wi-Fi, Bluetooth, Fire Wire, PCIe, or the like. For wireless connections, the host interface 176 according to example embodiments can be incorporated with the wireless transceiver 172.

Moreover, as shown in FIG. 2, the connectivity component(s) 170 can further include one or more human-machine interfaces (HMIs) 174 that can be used by the wearable computing device 100 to receive input data from user 10 and/or provide output data to the user 10. As such, the HMI(s) 174 can enable a user to interact with the wearable computing device 100. In some embodiments, the HMI(s) 174 can include one or more interfaces that provide information to a user, such as a display screen, a speaker, a haptic actuator, etc., and can also include one or more interfaces that allow a user to interact with information displayed on the screen, such as including a touch-screen component, a mouse component, a keyboard component, a stylus component, and the like. In some embodiments, the HMI(s) 174 can receive information from a user. For example, the HMI(s) 174 can receive user inputs (e.g., via sensors detecting a user pressing a virtual button on a touchscreen, via the mouse component receiving a user input specifying selection of information displayed on the screen, via the keyboard component receiving a user input specifying alphanumeric information, etc.) specifying information to the wearable computing device 100.

Figure 3:
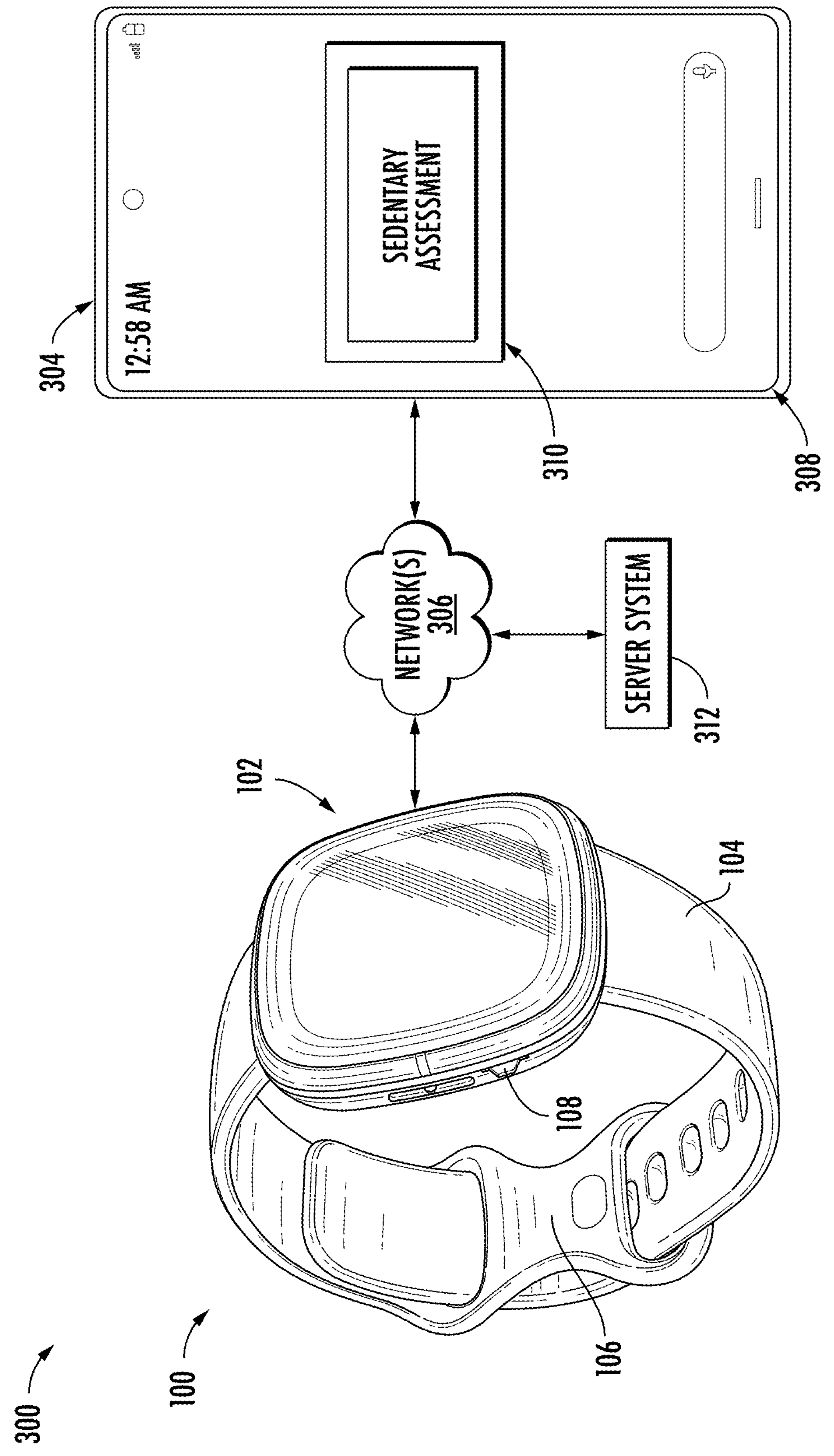
FIG. 3 illustrates a block diagram of an embodiment of a computing environment according to the present disclosure.

Referring now to FIG. 3, a diagram of an example computing environment 300 according to one or more example embodiments of the present disclosure is illustrated. As shown, the computing environment 300 depicted in FIG. 3 illustrates an example networked relationship between the wearable computing device 100 and a remote computing device, such as a mobile computing device 304 and/or a server system 312, in accordance with one or more embodiments.

With reference to the example embodiment described above and depicted in FIG. 2, the wearable computing device 100 according to example embodiments of the present disclosure can perform analyze and/or interpret a portion of the sensor data for the user 10 and/or perform operation(s) to based on the portion of the sensor data. As such, in certain embodiments the wearable computing device 100 can be capable of and/or configured to collect the portion of the sensor data of the user 10 and/or perform operation(s) using such readings.

However, in additional and/or alternative embodiments, the wearable computing device 100 and/or another electronic and/or computing device that can be used to detect the physiological data of the user 10, can be in communication with the mobile computing device 304. In these and/or other embodiments, the mobile computing device 304 can be configured to use the physiological data of the user 10 to perform the sedentary assessment of the user 10 according to one or more embodiments described herein. In these and/or other embodiments, based at least in part on (e.g., in response to) performing the sedentary assessment, the mobile computing device 304 can perform one or more operations described herein to facilitate alteration (e.g., improvement) of the user's health.

The wearable computing device 100 can also be configured to collect the physiological data of the user 10 using embedded sensors and/or external devices, as described throughout the present disclosure, and communicate or relay such data over one or more networks 306 to other devices. This includes, in some embodiments, relaying data to devices capable of serving as Internet-accessible data sources, thus permitting the collected data to be viewed, for example, using a web browser or network-based application at, for instance, the mobile computing device 304. For example, the wearable computing device 100, e.g., while being worn by the user 10, can capture, calculate, and/or store the physiological data of the user 10 using the sensor(s) 143. The wearable computing device 100 can then transmit (e.g., periodically or continuously) data representative of the physiological data over the network(s) 306 to the mobile computing device 304 and/or a server system 312 where the data can be stored, processed, and visualized by the user 10 and/or another entity (e.g., a health care professional). Accordingly, in an embodiment, the mobile computing device 304 may be configured to generate an intelligent notification 310 and provide the intelligent notification 310 to the user 10, e.g., via a display 308 or another HMI of a second computing device. In some embodiments, the intelligent notification 310 can include the sedentary assessment, which will be described further below.

In one or more embodiments, the communication between the wearable computing device 100 and the mobile computing device 304 can be facilitated by the network(s) 306. In some embodiments, the network(s) 306 may include, for instance, one or more of an ad hoc network, a peer-to-peer communication link, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, and/or any other type of network. In some embodiments, the communication between the wearable computing device 100 and the mobile computing device 304 can also be performed through a direct wired connection. In these or other embodiments, this direct-wired connection can be associated with any suitable or desirable communication protocol and/or physical connector such as, for instance, universal serial bus (USB), micro-USB, Wi-Fi, Bluetooth, Fire Wire, PCIe, or the like.

In example embodiments, a variety of computing devices can be in communication with the wearable computing device 100 to facilitate the user's sedentary assessment and/or alteration (e.g., improvement). Although the mobile computing device 304 is depicted as a smartphone in the example embodiment illustrated in FIG. 3, it should be understood that the present disclosure is not so limiting. For instance, the mobile computing device 304 according to example embodiments may include, for example, a smartphone with the display 308 as depicted in FIG. 3, a personal digital assistant (PDA), a mobile phone, a tablet, a personal computer, a laptop computer, a smart television, a video game console, and/or another computing device that can be external to the wearable computing device 100.

Figure 4:
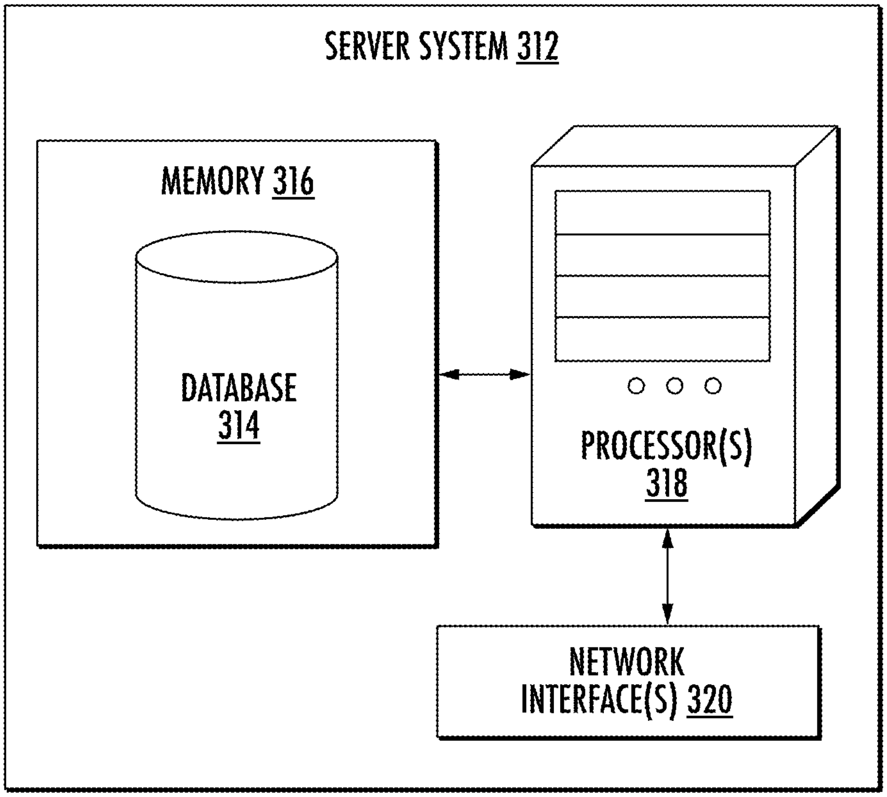
FIG. 4 illustrates a diagram of an embodiment of a server system according to the present disclosure.

Referring particularly to FIGS. 3 and 4, the wearable computing device 100 can transmit the physiological data of the user 10 to the server system 312 (e.g., via the network(s) 306). In this embodiment, the server system 312 can analyze the received physiological data to perform the sedentary assessment and/or can use the received physiological data to update a user profile for the user 10 that can be stored in a database 314 (e.g., a log) of a memory 316 (FIG. 4) of the server system 312.

In some embodiments, the server system 312 can be implemented on one or more standalone data processing apparatuses or a distributed network of computers. In some embodiments, the server system 312 can employ various virtual devices and/or services of third-party service providers (e.g., third-party cloud service providers) to provide the underlying computing resources and/or infrastructure resources of the server system 312. In some embodiments, the server system 312 can include, but is not limited to, a handheld computer, a tablet computer, a laptop computer, a desktop computer, or a combination of any two or more of these data processing devices or other data processing devices.

Referring particularly to FIG. 4, the server system 312 can include one or more processors 318 such as, for instance, one or more CPUs. In these or other embodiments, the server system 312 can include one or more network interfaces 320 that can include, for example, an input/output (I/O) interface to the mobile computing device 304 and/or the wearable computing device 100. In some embodiments, the server system 312 can include one or more communication buses for interconnecting these components.

The memory 316 according to example embodiments can include high-speed random-access memory such as, for instance, DRAM, SRAM, DDR RAM, or other random-access solid-state memory devices; and, optionally, can include non-volatile memory such as, for example, one or more magnetic disk storage devices, one or more optical disk storage devices, one or more flash memory devices, or one or more other non-volatile solid state storage devices. The memory 316, optionally, can include one or more storage devices that can be remotely located from the processor(s) 318 (e.g., processing unit(s)). Further, the memory 316, or alternatively the non-volatile memory within the memory 316, can include a non-transitory computer readable storage medium. In some embodiments, the memory 316, or the non-transitory computer readable storage medium of the memory 316, can store one or more programs, modules, and data structures. In these embodiments, such programs, modules, and data structures can include, but not be limited to, one or more of an operating system that can include procedures for handling various basic system services and for performing hardware dependent tasks.

Figure 5A:
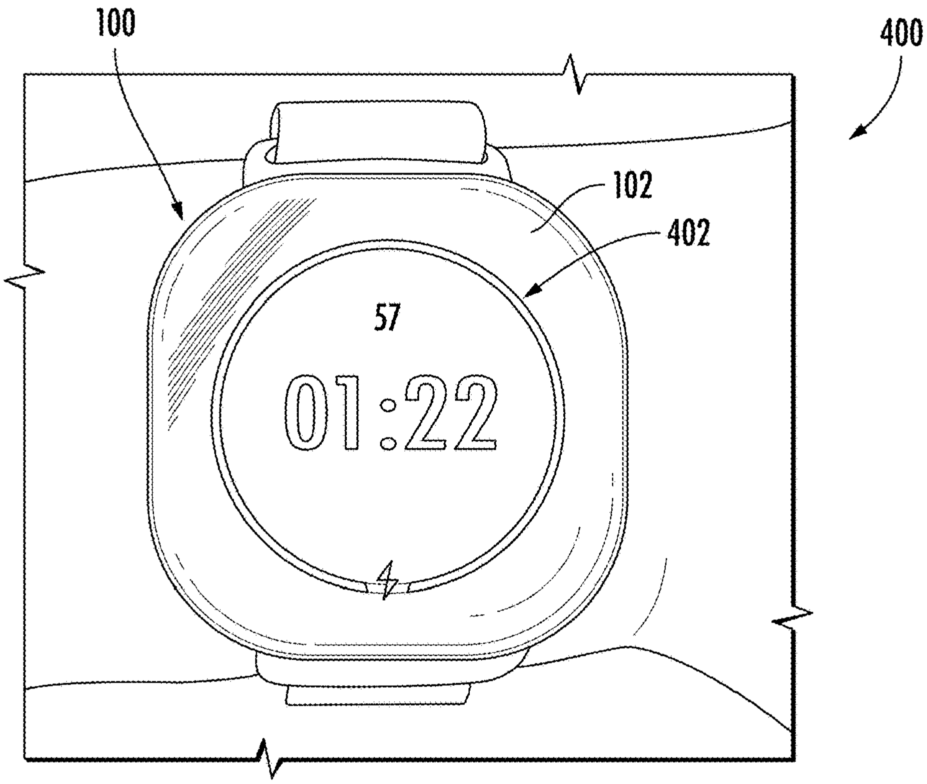
FIGS. 5A-5B illustrates example display screens of the wearable computing device according to the present disclosure.
Figure 5B:
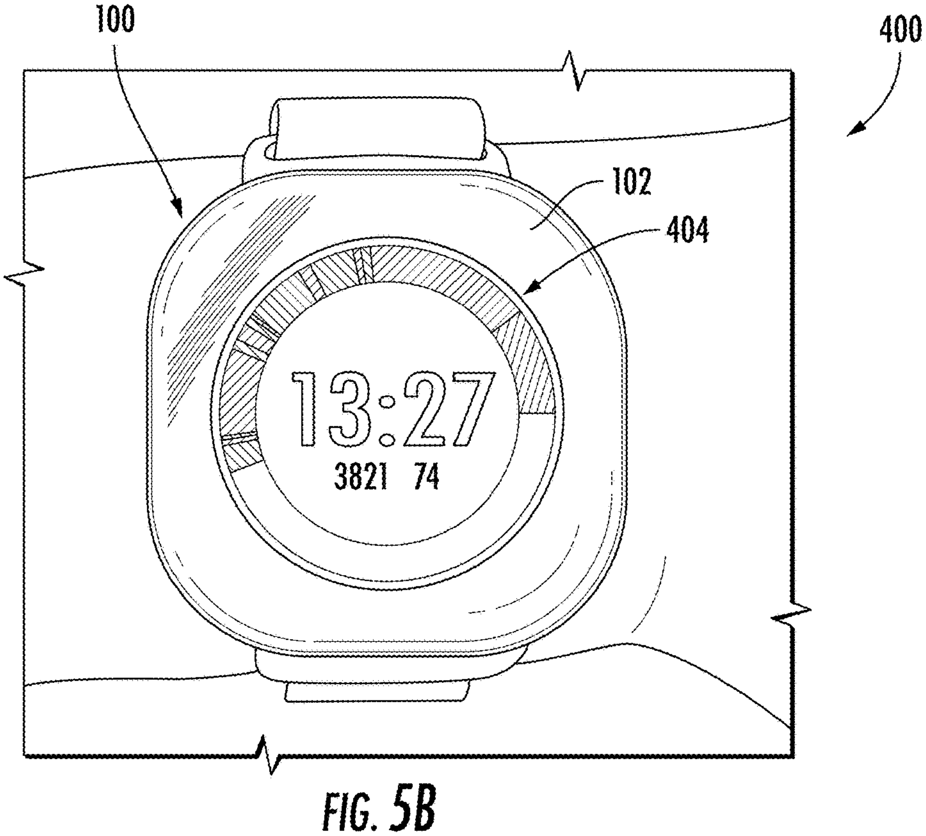

Referring now to FIGS. 5A and 5B, various views of a sedentary allowance program 400 being implemented on the wearable computing device 100, the mobile computing device 304, and/or the server system 312 as described herein are illustrated. In particular, the sedentary allowance program 400 may be implemented on a computer application programmed in any of the wearable computing device 100, the mobile computing device 304, and/or the server system 312. Accordingly, in an embodiment, the sedentary allowance program 400 is configured to provide users with proactive sedentary assessment and monitoring. In addition, the sedentary allowance program 400 may educate users about their historical sedentarism, provide an actionable assessment about their permitted sedentarism, and allow users to easily understand the magnitude and importance that performing various activities can have on their sedentary allowance.

In particular, the sedentary allowance program 400 may be configured to obtain one or more historical activities of the user. For example, the historical activity(ies) of the user 10 may be stored in the memory 183 of the wearable computing device 100. As such, the sedentary allowance program 400 can access the memory 183 to obtain the historical activity(ies) of the user 10. The historical activity(ies) may be determined (e.g., via the activity classifier 142, as discussed above) from the physiological data (e.g., obtained via the one or more physiological sensors 143, as discussed above) and/or the physiological metric(s) (e.g., calculated via the physiological metric module 141, as discussed above). Moreover, the sedentary allowance program 400 is configured to determine, via the sedentary assessment module 111, a sedentary allowance based at least partially on the historical activity(ies) of the user, as will be described further below. The historical activity(ies) can be defined by an activity level and a duration, as mentioned above regarding the current activity.

The sedentary allowance indicates an amount of time (e.g., seconds, minutes, etc.) that the user is permitted to remain sedentary. In some embodiments, the sedentary allowance may be determined based on a hazard ratio. The hazard ratio is a population-level index of relative risk of chronic disease progression, death or other outcome as determined by academic studies and/or health datasets established and/or maintained by healthcare professionals and/or organizations. In such embodiments, the sedentary allowance indicates an amount of time the user can remain sedentary until the hazard ratio, calculated based on physiological metrics, reaches a threshold. The threshold may, for example, be a value of 1. When the hazard ratio is associated with negative health outcomes (e.g., chronic disease progression, death, etc.), values greater than the threshold can indicate that the user is incurring above-average risk to their health via their sedentary behavior. Conversely, when the hazard ratio is associated with positive health outcomes (e.g., recovery, symptom resolution, etc.), values less than the threshold can indicate that the user is incurring above-average risk to their health via their sedentary behavior. As another example, the threshold may be specified or adjusted (e.g., based on a user input).

In other embodiments, the sedentary allowance may be determined based on the user achieving a health target within a specified time period. In such embodiments, the sedentary allowance indicates an amount of time the user can remain sedentary while still being able to achieve the health target based on previous user activities during a completed portion of the specified time period. For example, a statistical distribution of the user activities during the completed portion of the specified time period may be applied to a remaining portion of the specified time period to calculate the sedentary allowance (e.g., according to known statistical modeling techniques). In other words, the sedentary allowance can be calculated for a time instance based on the assumption that the statistical distribution of user activities prior to and after the time instance are identical. As an example, if the user achieved 50% of the health target within the first 40% of the specified time period, then it may be assumed that the user will complete the last 50% of the health target in the final 40% of the specified time period. As such, the sedentary allowance may be determined to be 20% of the specified time period. In some embodiments, the sedentary allowance can be further calculated for a time instance based on historical data that indicates user activities for prior specified time periods (e.g., prior hours, days, weeks, months, etc.). In such embodiments, the sedentary allowance can be further calculated based on the assumption that the statistical distribution of user activities of the prior specified time period and the current specified time period will be identical.

The health target may be achieving a specified number of steps, achieving a specified resting heart rate, standing for a specified duration, burning a specified number of calories, or any other suitable physiological metric. Further, the specified time period may be any suitable time period, such as a current day. The health target and/or the specified time period may, for example, be specified by the user (e.g., via a user input). As another example, the health target and/or the specified time period may be determined based on standardized health goals (e.g., set forth by healthcare professionals and/or organizations).

Further, the sedentary allowance program 400 is configured to provide the sedentary allowance to the user. For example, the sedentary allowance program 400 may be configured to generate various graphical user interfaces to provide indications, guidance, and/or instructions to the user regarding the sedentary allowance. In particular, the sedentary allowance program 400 is configured to determine the sedentary allowance based at least partially on the historical activity(ies) of the user, as will be described further below. For instance, the sedentary allowance program 400 may be configured to generate a graphical user interface (e.g., as shown in FIGS. 5A and 5B) to provide information about the sedentary allowance throughout a time period (e.g., a current day).

In one example, as shown in FIG. 5A, the display 102 of the wearable computing device 100 may display a ring 402. In such an example, the ring 402 may be configured to be displayed as one color (e.g., green) when the sedentary allowance is greater than a threshold. Further, the ring 402 may be configured to be displayed as another color (e.g., red) when the sedentary allowance is equal to or less than the threshold. The sedentary allowance program 400 may include various thresholds such that the ring 402 may be configured to be various colors based on comparisons between the sedentary allowance and the various thresholds. In such an example, the ring 402 may change between various colors as the sedentary allowance approaches a final threshold (e.g., zero seconds) so as to provide a visual indication to the user that the sedentary allowance is approaching the final threshold. In other words, the color of the ring 402 may change over time as the sedentary allowance approaches the final threshold (e.g., zero seconds).

In another example, as shown in FIG. 5B, the display 102 of the wearable computing device 100 may display a tracker 404. In such an example, the tracker 404 may be configured to display activities for a time period, such as a current day. For example, during the time period, the tracker 404 may be configured to display durations of a current activity of the user and historical activities of the user that occurred during the time period. In such an example, the tracker 404 may be further configured to sequentially display the durations of the historical and current activities. As mentioned, the durations of the historical and current activities may be displayed based on start and end timestamps defining the respective durations. Furthermore, the tracker 404 may be configured to display durations of non-sedentary activities in one color (e.g., green) and durations of sedentary activities in another color (e.g., red) so as to provide a visual indication to the user of the relative amount of time spent performing sedentary and non-sedentary activities during the time period.

In addition, the tracker 404 may be configured to display the sedentary allowance in yet another color (e.g., blue). The sedentary allowance may be displayed from a current time and extend to a future time. The future time may be determined by combining (e.g., via addition) the sedentary allowance to the current time. Further, the tracker 404 may be configured to display updates to the sedentary allowance (e.g., in real time or at predetermined time intervals, such as every 1 second, 5 seconds, 30 seconds, etc.). As such, the tracker 404 may be configured to display the sedentary allowance decreasing (i.e., approaching the current time) when the current activity is a sedentary activity. Alternatively, the tracker 404 may be configured to display the sedentary allowance moving with or increasing from the current time when the current activity is a non-sedentary activity. As such, the tracker 404 may provide the user with visual indications of a real-time change in the sedentary allowance based on the current activity of the user.

In addition, the sedentary allowance program 400 may be configured to output an alert to the user in response to the sedentary allowance being less than or equal to a threshold, such as the final threshold (e.g., zero seconds). In other words, the alert may be output in response to the sedentary allowance expiring so as to notify the user that the sedentary allowance expired. The alert may include audio, visual, and/or haptic feedback. In particular, one or more of the HMIs 174 can be actuated to output the alert. In some embodiments, for example, the display 102 of the wearable computing device 100 can be actuated to display a graphical user interface (e.g., a blinking symbol, a textual message, etc.). In additional or alternative embodiments, a speaker of the wearable computing device 100 may be actuated to output a sound tone or a message. In additional or alternative embodiments, a haptic actuator (not shown) of the wearable computing device 100 may be actuated to cause the wearable computing device 100 to vibrate. In some embodiments, the sedentary allowance program 400 may be configured to output the alert at specified time intervals (e.g., every 1 minute, 5 minutes, etc.) until the sedentary allowance exceeds the threshold.

Figure 6A:
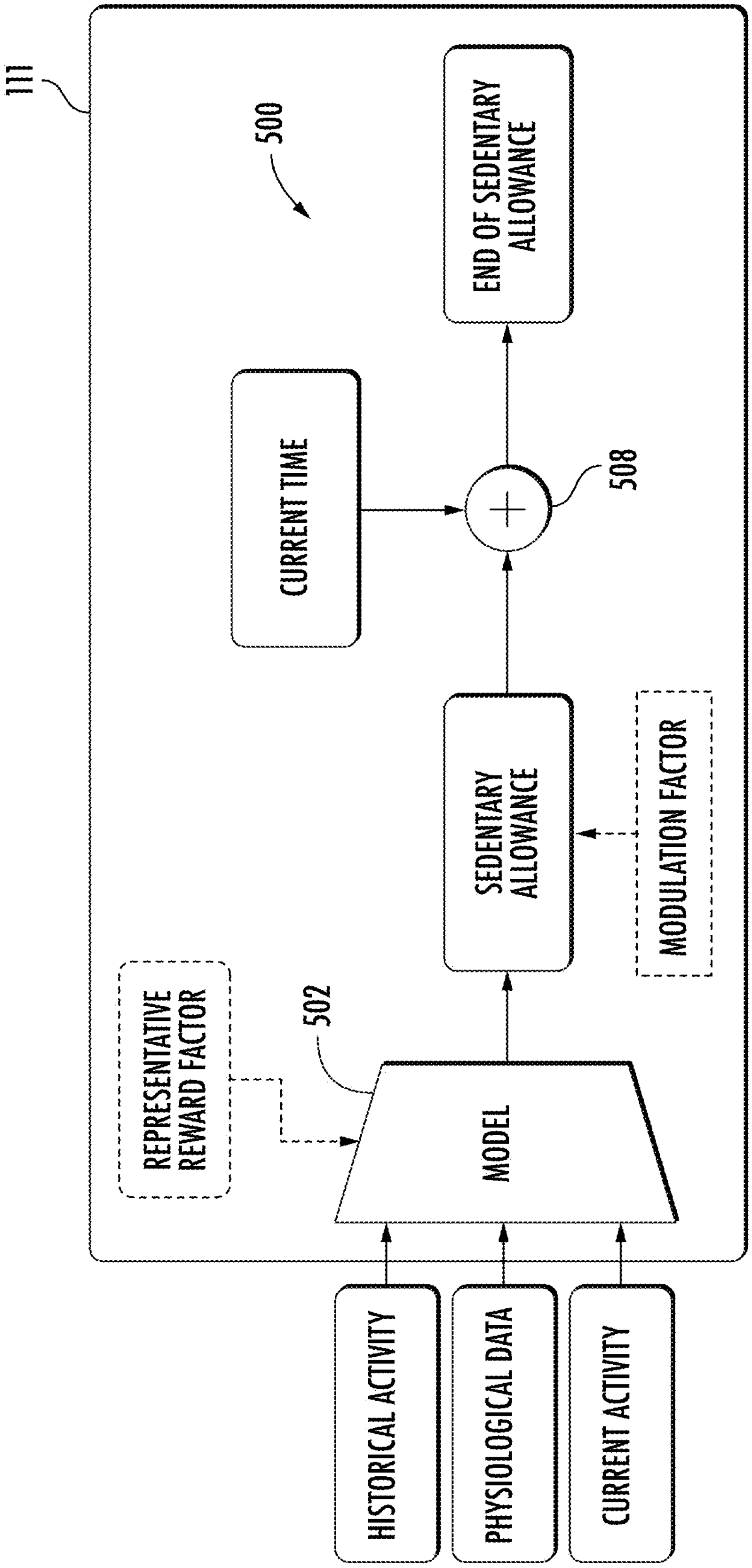
FIGS. 6A-6B illustrate schematic diagrams of example sedentary assessment modules according to the present disclosure.
Figure 6B:
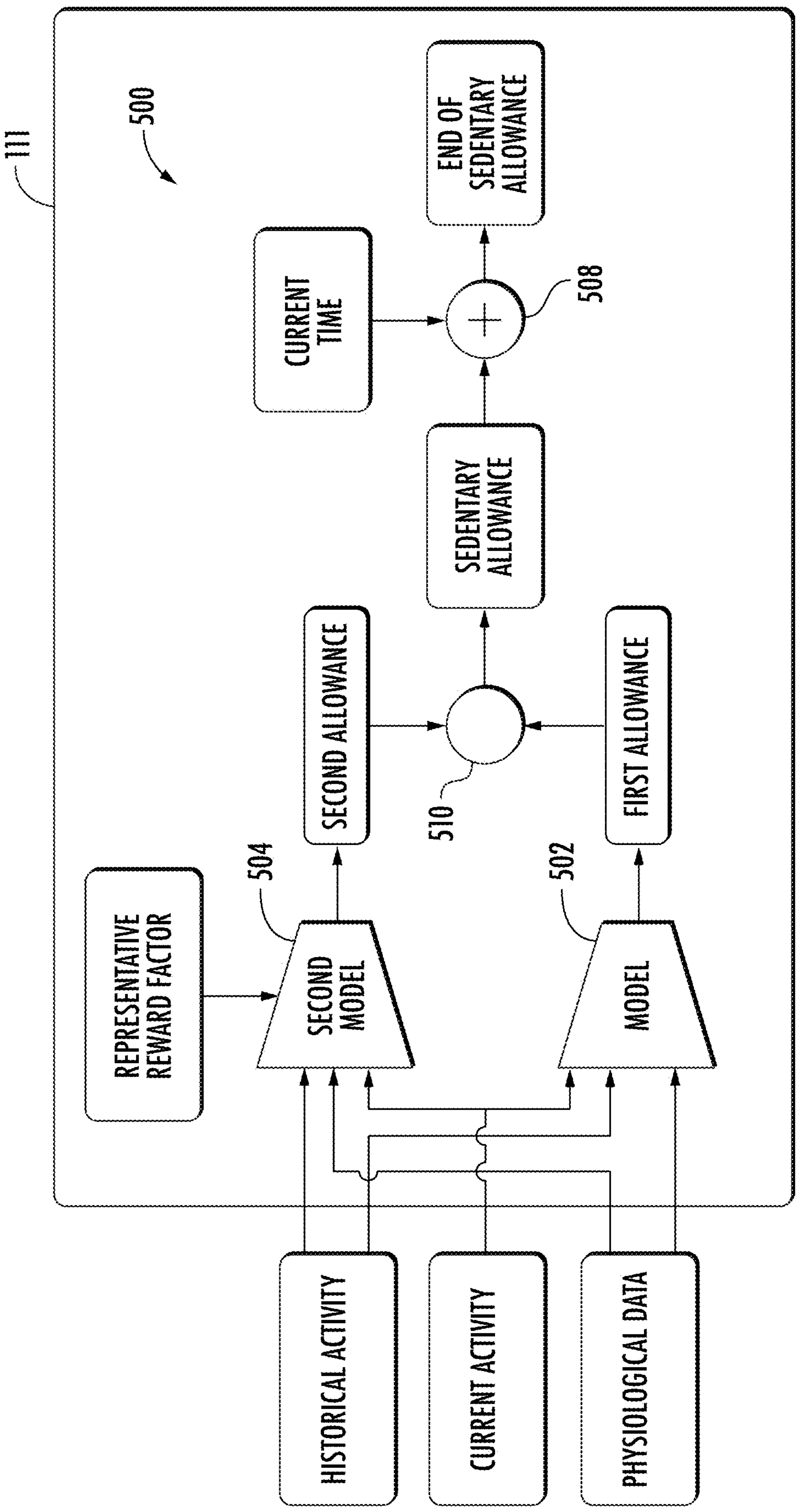

Referring now to FIGS. 6A and 6B, the sedentary assessment module 111 is configured to perform a sedentary allowance determination operation 500. For example, in an embodiment, the sedentary assessment module 111 can input one or more historical activities, physiological data, and/or the current activity of the user to one or more models. In some embodiments, as shown in FIG. 6A, the sedentary assessment module 111 can input the historical activity(ies), the current activity, and/or physiological data of the user to one model 502. In certain embodiments, the sedentary assessment module 111 may be configured to also input a representative reward factor (described further below) to the model 502. In such an example, as shown in FIG. 6A, the sedentary assessment module 111 can receive a sedentary allowance as a prediction output by the model 502. That is, the model 502 can be trained to accept the historical activities, physiological data of the user, the current activity of the user, and/or the representative reward factor as inputs and to generate an output of the sedentary allowance based on such inputs. In some embodiments, the model 502 can be configured to recompute the sedentary allowance at specified time intervals (e.g., every 1 minute, every 5 minutes, every 30 minutes, etc.). In other embodiments, the model 502 can be configured to continuously increment or decrement the sedentary allowance (e.g., in response to the current activity being non-sedentary or sedentary, respectively). In certain embodiments, the sedentary assessment module 111 may be further configured to apply a modulation factor (described further below) to the sedentary allowance and/or to one or more parameters of the model 502 (such as the hazard ratio threshold) so as to adjust the sedentary allowance (e.g., to be more or less strict) based on user preferences.

In addition, the sedentary assessment module 111 is further configured to determine an end of the sedentary allowance based on a current time. In particular, the sedentary assessment module 111 can receive the current time, as shown. The sedentary assessment module 111 can then determine the end of the sedentary allowance by combining (e.g., via summation as shown at 508) the sedentary allowance and the current time.

In other embodiments, as shown in FIG. 6B, the sedentary assessment module 111 can be configured to input the historical activity(ies), the current activity, and/or the physiological data of the user to the model 502 and a second model 504. In such embodiments, the sedentary assessment module 111 can be further configured to input the representative reward factor to the second model 504, as shown. In additional or alternative embodiments, the sedentary assessment module 111 can be configured to input a second representative reward factor the model 502, which can differ from the representative reward factor input to the second model 504. As shown in FIG. 6B, the sedentary assessment module 111 can receive a first allowance as a prediction output by the model 502 and a second allowance as a prediction output by the second model 504. That is, the models 502, 504 can be trained to accept the historical activities, physiological data of the user, the current activity of the user, and/or the representative reward factor(s) as inputs and to generate an output of a respective allowance for the sedentary allowance based on such inputs. As shown at 510, the sedentary assessment module 111 may be further configured to combine (e.g., via averaging, a weighted sum, a linear function, a non-linear function, or any other suitable mathematical technique) the first allowance and the second allowance to obtain the sedentary allowance. As an example, the sedentary assessment module 111 may be configured to determine the sedentary allowance based on Equation 1.

$$SA = w*\min(D_1,D_2)+(1-w)*\max(D_1,D_2)$$

where SA is the sedentary allowance, $D_1$ is the first duration, $D_2$ is the second duration, and w is a weight (e.g., specified via a user input) configured to bias the sedentary allowance towards a more strict (e.g., min $(D_1, D_2)$) or a more lenient (e.g., max $(D_1, D_2)$) duration.

The sedentary assessment module 111 can be configured to determine the end of sedentary allowance in substantially the same manner as just described above regarding FIG. 6A, and thus, will not be repeated for brevity.

As mentioned above, in some embodiments, the sedentary assessment module 111 may be configured to determine the sedentary allowance by applying (e.g., via multiplication, addition, etc.) the modulation factor to the sedentary allowance and/or the parameter(s) of the model(s) 502, 504. The modulation factor may be a real number (such as an integer, a rational number, a decimal number, etc.) configured to modulate (or adjust) the sedentary allowance (e.g., based on user preferences for more or less strict sedentary allowances). That is, the modulation factor may be employed to increase or decrease the sedentary allowance to account for user preferences. In some embodiments, the modulation factor may be a specified duration of time that is combined (e.g., via addition or subtraction) with the sedentary allowance. In other embodiments, the modulation factor may be a scale that is combined (e.g., via multiplication) with the sedentary allowance and/or the parameter(s) of the model(s) 502, 504 (e.g., such as the hazard ratio threshold).

The modulation factor may be specified via a user input. For example, the display 102 of the wearable computing device 100 may be configured to receive a user input specifying the modulation factor. In some embodiments, the display 102 of the wearable computing device 100 may prompt the user to specify the modulation factor (e.g., in response to initialization of the sedentary allowance program 400). Allowing the user to specify the modulation factor for adjusting the sedentary duration may increase the likelihood of the user continuing to follow guidance from the sedentary allowance program 400 by personalizing the sedentary allowance to the user.

Moreover, in some embodiments, the model(s) 502, 504 may be configured to determine the sedentary allowance based at least partially on the representative reward factor, as mentioned above. The representative reward factor may be determined during training of the model(s) 502, 504. For instance, during training, the representative reward factor may be an output of an aggregation algorithm applied to a plurality of user feedbacks from a plurality of respective users. The user feedbacks may, for example, be specified via respective user inputs obtained via a user study. For example, the display 102 of the wearable computing device 100 may prompt the user to specify the user feedback during the user study. In particular, the wearable computing device 100 may identify various activities and request user feedback indicating an expected duration of the sedentary allowance as a result of the user performing the various activities. The sedentary assessment module 111 may be configured to then provide the plurality of user feedbacks to the aggregation algorithm (which may be an average, a weighted sum, or any other suitable aggregation algorithm) to obtain the representative reward factor. As such, the representative reward factor may be implemented so as to bias the sedentary allowance output by the model(s) 502, 504 towards the expected duration of the sedentary allowance indicated by the plurality of user feedbacks. Biasing the sedentary allowance towards the expected duration of the sedentary allowance may increase the likelihood of users continuing to follow guidance from the sedentary allowance program 400 by providing a sedentary allowance that is more likely to be perceived as equitable by users.

Figure 7:
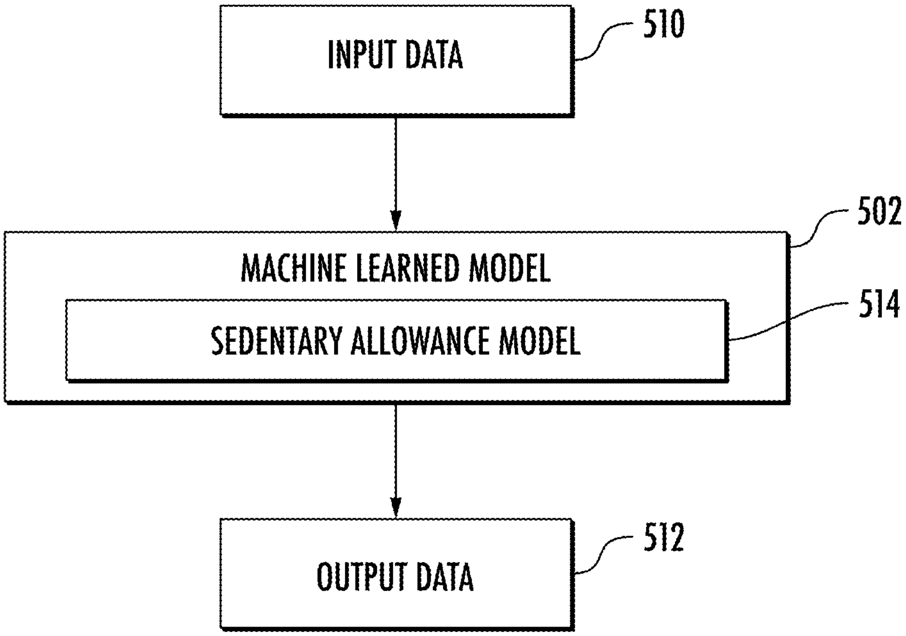
FIG. 7 illustrates a block diagram of an example machine-learned model according to the present disclosure.

In an embodiment, the model(s) 502, 504 can be a software program loaded in memory and executed by a processor included in a computing device (e.g., the wearable computing device 100, the mobile computing device 304 and/or the server system 312). In some embodiments, model(s) 502, 504 may be a machine-learned model, as shown in FIG. 7. In such embodiments, the machine-learned model(s) 502, 504 can be trained to receive input data 510 and generate output data 512. For example, the model(s) 502, 504 can include a sedentary allowance model 514 that is operable to predict a sedentary allowance for a user 10 based on physiological data, current activity, and/or historical activities of the user 10. That is, the model(s) 502, 504 may be further trained to output the predicted sedentary allowance in response to receiving the physiological data, the current activity, and/or historical activities of the user as the input data 510, as shown in FIG. 7. The machine-learned model(s) 502, 504 may be trained with ground truth data (i.e., data about a real-world condition or state). The ground truth data may include, but is not limited to, physiological data for various users, health risks associated with various physiological metrics for various users, demographic and/or anthropometric data for various users, various sedentary and non-sedentary activities of various users, and/or datasets including longitudinal activity pattern recordings and health outcomes or other surrogate measures of health outcomes. Training the machine-learned model(s) 502, 504 can include updating weights and biases via suitable techniques, such as back-propagation.

The machine-learned model(s) 502, 504 can be or include one or multiple machine-learned models or model components. Example machine-learned models can include neural networks (e.g., deep neural networks) or a generative model (e.g., large language models (LLM), non-linear models or linear models, decision tree based models, support vector machines, hidden Markov models, Bayesian networks, and/or k-means clustering models, etc. Example machine-learned models can also use other architectures in lieu of or in addition to those models specifically mentioned herein.

Neural networks, such as those described herein, can include feed-forward neural networks, recurrent neural networks (e.g., long short-term memory recurrent neural networks), convolutional neural networks, and/or other forms of neural networks. Some example machine-learned models can leverage an attention mechanism such as self-attention. For example, some example machine-learned models can include multi-headed self-attention models (e.g., transformer models). In another embodiment, the machine learning models described herein may include a rule-based approach, wherein actions are chosen based on a predetermined set of if-then rules or mathematical expressions with pre-defined parameters.

Although certain embodiments are disclosed herein in the context of the model(s) 502, 504 being machine-learned models, it should be appreciated that the present disclosure is not so limiting. For example, it should be understood that the sedentary allowance determination principles and features disclosed herein can be performed and/or implemented using any suitable type of model or combination of models such as, for example, statistical models (e.g., a linear regression model), a look-up table (or the like), a signal processing convolution with an activity-allowance impulse response, subject feedback models, regression/curve fitting, finite impulse response (FIR) models, and/or any other suitable type of model.

Example Methods

Figure 8:
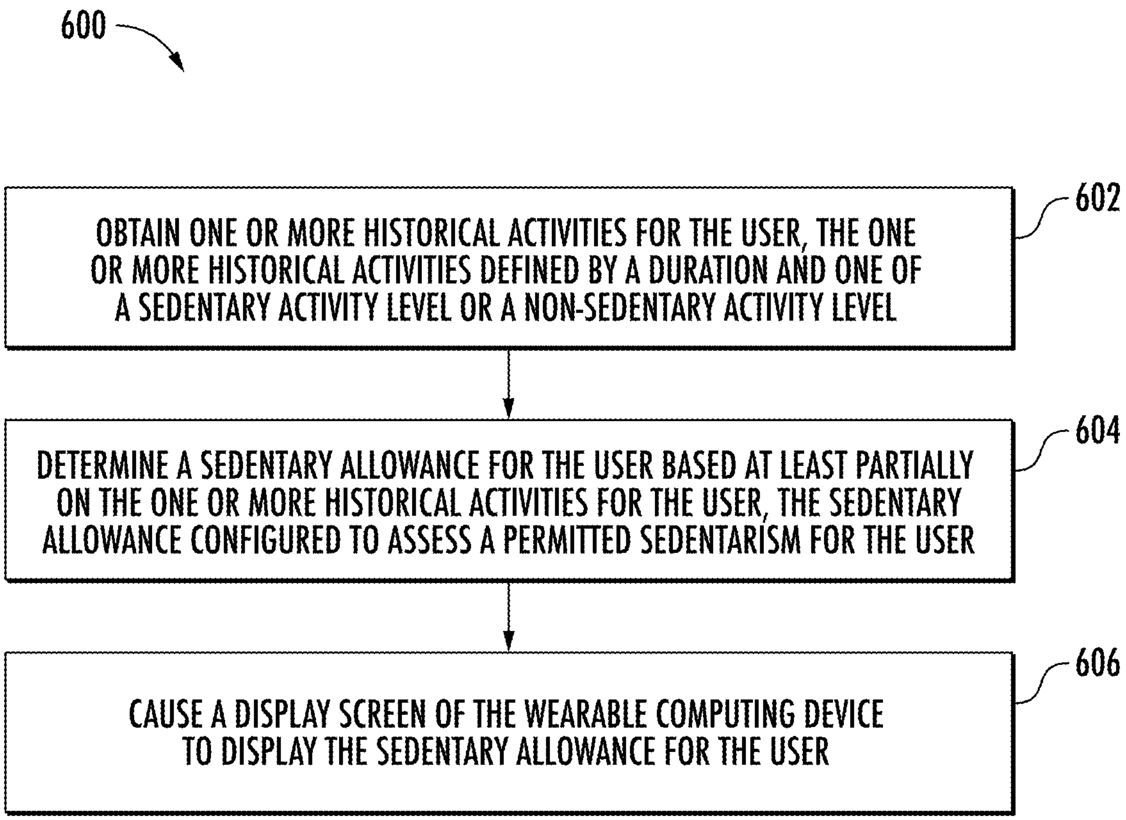
FIG. 8 illustrates an example flow chart of an embodiment of a method for performing a sedentary assessment of a user via the wearable computing device according to the present disclosure.

FIG. 8 illustrates a flow diagram of an example computer-implemented method 600 according to one or more example embodiments of the present disclosure. The computer-implemented method 600 can be implemented using, for instance, the wearable computing device 100, the mobile computing device 304, and/or the server system 312 described above with reference to the example embodiments depicted in FIGS. 1-7.

The example embodiment illustrated in FIG. 8 depicts operations performed in a particular order for purposes of illustration and discussion. Those of ordinary skill in the art, using the disclosures provided herein, will understand that various operations or steps of the computer-implemented method 600 or any of the other methods disclosed herein can be adapted, modified, rearranged, performed simultaneously, include operations not illustrated, and/or modified in various ways without deviating from the scope of the present disclosure.

As shown at (602), the computer-implemented method 600 may include obtaining, by a computing device (e.g., the wearable computing device 100, the mobile computing device 304, and/or the server system 312) operatively coupled to one or more processors (e.g., the processor(s) 181, the processor(s) 318), one or more historical activities for the user. As mentioned, the historical activities are defined by a duration (specifying start and end timestamps) and one of a sedentary activity level or a non-sedentary activity level. As mentioned, the historical activity(ies) may be determined from the physiological data and/or the physiological metric(s) of the user. Further, the historical activity(ies) of the user may be stored in and accessible from the memory 183 of the wearable device 100, as mentioned.

As shown at (604), the computer-implemented method 600 may include determining, by a computing device (e.g., the wearable computing device 100, the mobile computing device 304, and/or the server system 312) operatively coupled to one or more processors (e.g., the processor(s) 181, the processor(s) 318), a sedentary allowance for the user based at least partially on the historical activity(ies) for the user. The sedentary allowance is configured to assess a permitted sedentarism for the user. As mentioned, the sedentary allowance can be determined based on a hazard ratio or a health target. In some embodiments, as mentioned, the sedentary allowance can be determined based additionally on a modulation factor, a representative reward factor, and/or physiological data of the user.

As shown at (606), the computer-implemented method 600 may include causing, by a computing device (e.g., the wearable computing device 100, the mobile computing device 304, and/or the server system 312) operatively coupled to one or more processors (e.g., the processor(s) 181, the processor(s) 318), a display screen of an electronic device (e.g., the wearable computing device 100, the mobile computing device 304, etc.) to display the sedentary allowance for the user. Further, the computer-implemented method 600 may include determining a current activity for the user based on physiological data of the user, as mentioned. The computer-implemented method 600 may further include determining the sedentary allowance based additionally on the current activity for the user, as mentioned. In addition, the computer-implemented method 800 may further include outputting an alert (e.g., including audio, visual, and/or haptic feedback) to the user when the sedentary allowance expires.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A method for facilitating a sedentary assessment of a user, the method comprising:

obtaining one or more historical activities for the user, the one or more historical activities defined by a respective duration and a respective one of a sedentary activity level or a non-sedentary activity level;

determining a sedentary allowance for the user based at least partially on the one or more historical activities for the user and a representative reward factor, the representative reward factor comprising an aggregate output of a plurality of user feedbacks specified by a plurality of respective users and is configured to bias the sedentary allowance towards an expected sedentary allowance, wherein the sedentary allowance is configured to assess a permitted sedentarism for the user; and causing a display screen of a wearable computing device to display the sedentary allowance for the user.

2. The method of claim 1, further comprising:

obtaining, via one or more physiological sensors, physiological data of the user;

determining a current activity for the user based on the physiological data, the current activity defined by a duration and one of the sedentary activity level or the non-sedentary activity level; and determining the sedentary allowance for the user based additionally on the current activity for the user.

3. The method of claim 1, further comprising, in response to determining the sedentary allowance is less than or equal to a threshold, causing one or more components of the wearable computing device to output an alert to the user, wherein the alert comprises at least one of audio, visual, and haptic feedback.

4. The method of claim 1, further comprising:

receiving a modulation factor via a user input; and adjusting the sedentary allowance for the user based on the modulation factor.

5. The method of claim 1, further comprising:

obtaining, via one or more physiological sensors, physiological data of the user; and determining the sedentary allowance for the user based additionally on the physiological data of the user.

6. The method of claim 1, further comprising:

determining, via a first model, a first duration based at least partially on the one or more historical activities for the user and the representative reward factor;

determining, via a second model, a second duration based at least partially on the one or more historical activities for the user; and determining the sedentary allowance as a function of the first duration and the second duration.

7. The method of claim 1, wherein the wearable computing device is a smart watch.

8. A wearable computing device, comprising:

one or more processors; and one or more computer-readable media that collectively store instructions that, when executed by the one or more processors, cause the wearable computing device to perform operations, the operations comprising:

obtaining one or more historical activities for a user, the one or more historical activities defined by a respective duration and a respective one of a sedentary activity level or a non-sedentary activity level;

determining a sedentary allowance for the user based at least partially on the one or more historical activities for the user and a representative reward factor, the representative reward factor comprising an aggregate output of a plurality of user feedbacks specified by a plurality of respective users and is configured to bias the sedentary allowance towards an expected sedentary allowance, wherein the sedentary allowance is configured to assess a permitted sedentarism for the user; and causing a display screen of the wearable computing device to display the sedentary allowance for the user.

9. The wearable computing device of claim 8, wherein the operations further comprise:

obtaining, via one or more physiological sensors, physiological data of the user;

determining a current activity for the user based on the physiological data, the current activity defined by a duration and one of the sedentary activity level or the non-sedentary activity level; and determining the sedentary allowance for the user based additionally on the current activity for the user.

10. The wearable computing device of claim 8, wherein the operations further comprise, in response to determining the sedentary allowance is less than or equal to a threshold, causing one or more components of the wearable computing device to output an alert to the user, wherein the alert comprises at least one of audio, visual, and haptic feedback.

11. The wearable computing device of claim 8, wherein the operations further comprise:

receiving a modulation factor via a user input; and adjusting the sedentary allowance for the user based on the modulation factor.

12. The wearable computing device of claim 8, wherein the operations further comprise:

obtaining, via one or more physiological sensors, physiological data of the user; and determining the sedentary allowance for the user based additionally on the physiological data of the user.

13. The wearable computing device of claim 8, wherein the operations further comprise:

determining, via a first model, a first duration based at least partially on the one or more historical activities for the user and the representative reward factor;

determining, via a second model, a second duration based at least partially on the one or more historical activities for the user; and determining the sedentary allowance as a function of the first duration and the second duration.

14. The wearable computing device of claim 8, wherein the wearable computing device is a smart watch.

15. A method for facilitating a sedentary assessment of a user, the method comprising:

obtaining one or more historical activities for the user, the one or more historical activities defined by a respective duration and a respective one of a sedentary activity level or a non-sedentary activity level;

determining a sedentary allowance for the user based at least partially on the one or more historical activities for the user and a representative reward factor, the representative reward factor comprising an aggregate output of a plurality of user feedbacks specified by a plurality of respective users and is configured to bias the sedentary allowance towards an expected sedentary allowance, wherein the sedentary allowance is configured to assess a permitted sedentarism for the user; and in response to determining the sedentary allowance is less than or equal to a threshold, causing one or more components of a user computing device to output an alert to the user, the alert comprising at least one of audio, visual, and haptic feedback.

16. The method of claim 15, further comprising:

obtaining, via one or more physiological sensors, physiological data of the user;

determining a current activity for the user based on the physiological data, the current activity defined by a duration and one of the sedentary activity level or the non-sedentary activity level; and determining the sedentary allowance for the user based additionally on the current activity for the user.

17. The method of claim 15, further comprising:

obtaining, via one or more physiological sensors, physiological data of the user; and determining the sedentary allowance for the user based additionally on the physiological data of the user.

18. The method of claim 15, further comprising:

determining, via a first model, a first duration based at least partially on the one or more historical activities for the user and the representative reward factor;

determining, via a second model, a second duration based at least partially on the one or more historical activities for the user; and determining the sedentary allowance as a function of the first duration and the second duration.

* * * * *